(12) United States Patent
Behm et al.

(10) Patent No.: US 7,398,172 B2
(45) Date of Patent: Jul. 8, 2008

(54) METHOD AND SYSTEM OF PROVIDING A DYNAMIC SAMPLING PLAN FOR INTEGRATED METROLOGY

(75) Inventors: Gary W. Behm, Hopewell Junction, NY (US); Emily M. Hwang, Hopewell Junction, NY (US); Yue J. Li, Hopewell Junction, NY (US); Teresita Q. Magtoto, Poughkeepsie, NY (US); Derek C. Stoll, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/421,082

(22) Filed: May 31, 2006

(65) Prior Publication Data

US 2007/0282549 A1 Dec. 6, 2007

(51) Int. Cl.
*G06F 15/00* (2006.01)

(52) U.S. Cl. .......................................... 702/83; 382/149

(58) Field of Classification Search ......... 702/182–185, 702/83, 118–119; 382/149
See application file for complete search history.

(56) References Cited

U.S. PATENT DOCUMENTS

| 5,784,554 | A | 7/1998 | Hsiung |
| 6,442,496 | B1 | 8/2002 | Pasadyn et al. |
| 6,687,561 | B1 | 2/2004 | Pasadyn et al. |
| 6,821,792 | B1 | 11/2004 | Sonderman et al. |
| 6,920,405 | B2 | 7/2005 | Lawrence |
| 2006/0184264 | A1* | 8/2006 | Willis et al. .................. 700/108 |

* cited by examiner

*Primary Examiner*—Edward Raymond
(74) *Attorney, Agent, or Firm*—Lisa U. Jaklitsch; Hoffman, Warnick & D'Alessandro LLC

(57) ABSTRACT

A method and system of providing a dynamic sampling plan for integrated metrology is disclosed. The method may include modeling a sampling plan for use with a factory level advanced processing control (FL-APC) system and sending a recommended sampling plan, in response to receiving a request for a sampling plan, wherein the recommended sampling plan is based upon the modeling and the request. The recommended sampling plan may be sent to an equipment interface (EI) and on to a tool for implementation in a manufacturing environment.

8 Claims, 4 Drawing Sheets

METHOD AND SYSTEM OF PROVIDING A DYNAMIC SAMPLING PLAN FOR INTEGRATED METROLOGY

BACKGROUND OF THE INVENTION

1. Technical Field

The invention relates generally to metrology in a manufacturing environment, and more particularly, to a method and system of providing a dynamic sampling plan for integrated metrology (IM) associated with a wafer manufacturing process tool.

2. Background Art

Manufacturers, especially semiconductor fabricators, who implement advanced process control (APC) systems, generally do so at the factory level. APC systems take measurements of particular structures before and after a processing step and provide corrections to recipes for feeding forward and/or feeding back to tools to achieve a better product. FIG. 1 shows a typical semiconductor fabricator environment 10 including a number of tools 12, a manufacturing execution system (MES) 14 that controls all product movements through environment 10, e.g., it schedules product movements, and an equipment interface (EI) 18 that interfaces between MES 14 and different tools 12. Although not shown, middleware may be present for communication between MES 14 and EI 18. Each tool 12 includes process equipment, or process chambers 20 particular to its function, e.g., an etching chamber, gas source, appropriate electronics, etc., in the case of an etching tool 12.

One of the steps in wafer manufacturing is measurement or metrology. Metrology may be provided by an external metrology tool (not shown) or an integrated metrology (IM) module 22 associated with a particular process tool 12. Providing sampling plans to external metrology tools has been a subject of several inventions. The next challenge lies in providing a dynamic sampling plan for an IM module 22.

An increasing number of prominent tool vendors are developing an IM module 22 as part of the tools 12. The IM module 22 may be configured and used either for pre- or post-measurement. Currently, the only method of using a sampling plan is to hard code a sampling plan into the EI 18 and pass it directly to IM module 22. This method has shortcomings due to the inflexibility of IM module 22. For example, IM module 22 can only be turned on to measure every wafer; turned off so as to measure no wafers; or, only measure wafers having a fixed frequency (which is typically based on a particular slot position of a front opening unified pod (FOUP) 24). However, because in some cases the particular slot in the FOUP 24 may be empty, the method is rendered ineffective. Further, a problem arises because, typically, there are multiple process chambers 20 and only one IM module 22 in a process tool 12. This ultimately leads to a bottleneck in the throughput of the tool 12.

In view of the foregoing, a need exists to overcome one or more of the deficiencies in the related art.

SUMMARY OF THE INVENTION

A method and system of providing a dynamic sampling plan for integrated metrology is disclosed. The method may include modeling a sampling plan for use with a factory level advanced processing control (FL-APC) system and sending a recommended sampling plan, in response to receiving a request for a sampling plan, wherein the recommended sampling plan is based upon the modeling and the request. The recommended sampling plan may be sent to an equipment interface (EI) and on to a tool for implementation in a manufacturing environment.

A first aspect of the invention provides a method comprising: modeling a sampling plan for use with a factory level advanced processing control (FL-APC) system; receiving a request for a sampling plan; and sending a recommended sampling plan, based upon the request and the modeling.

A second aspect of the invention provides a computer program product comprising a computer readable medium including a computer readable program, wherein the computer readable program when executed on a computer causes the computer to: model a sampling plan for use with a factory level advanced processing control (FL-APC) system; receive a request for a sampling plan; and send a recommended sampling plan, based upon the request and the modeling.

A third aspect of the invention provides a system comprising: a factory level advanced process control (FL-APC) system; and a dynamic sampling plan system communicatively coupled to the FL-APC system.

A fourth aspect of the invention provides a method for deploying an application for providing a dynamic sampling plan for integrated metrology, comprising: providing a computer infrastructure being operable to: model a sampling plan for use with a factory level advanced processing control (FL-APC) system; receive a request for a sampling plan; and send a recommended sampling plan, based upon the request and the modeling.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method and system of providing a dynamic sampling plan for integrated metrology (IM), typically associated with a wafer manufacturing process tool.

Figure 1:
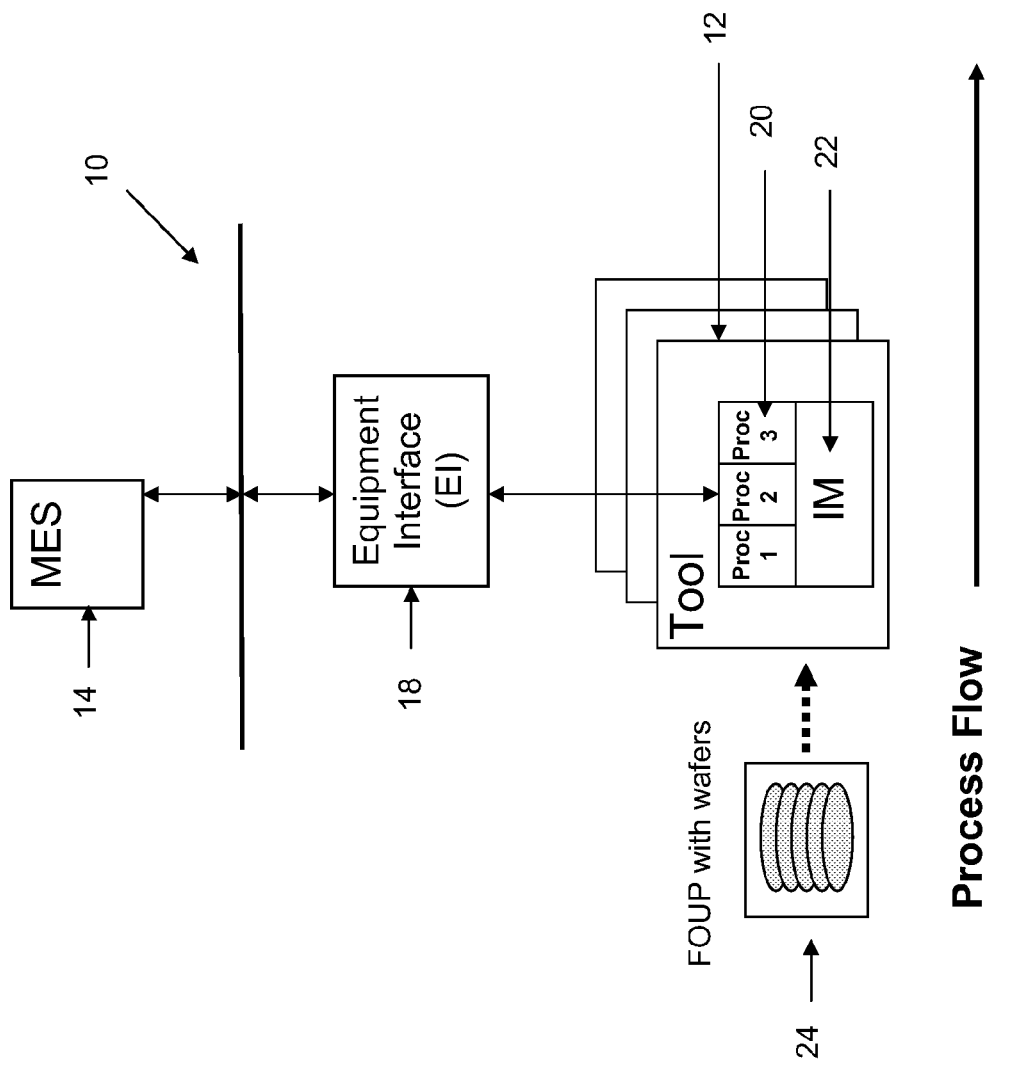
FIG. 1 shows a conventional semiconductor fabrication environment.
Figure 2:
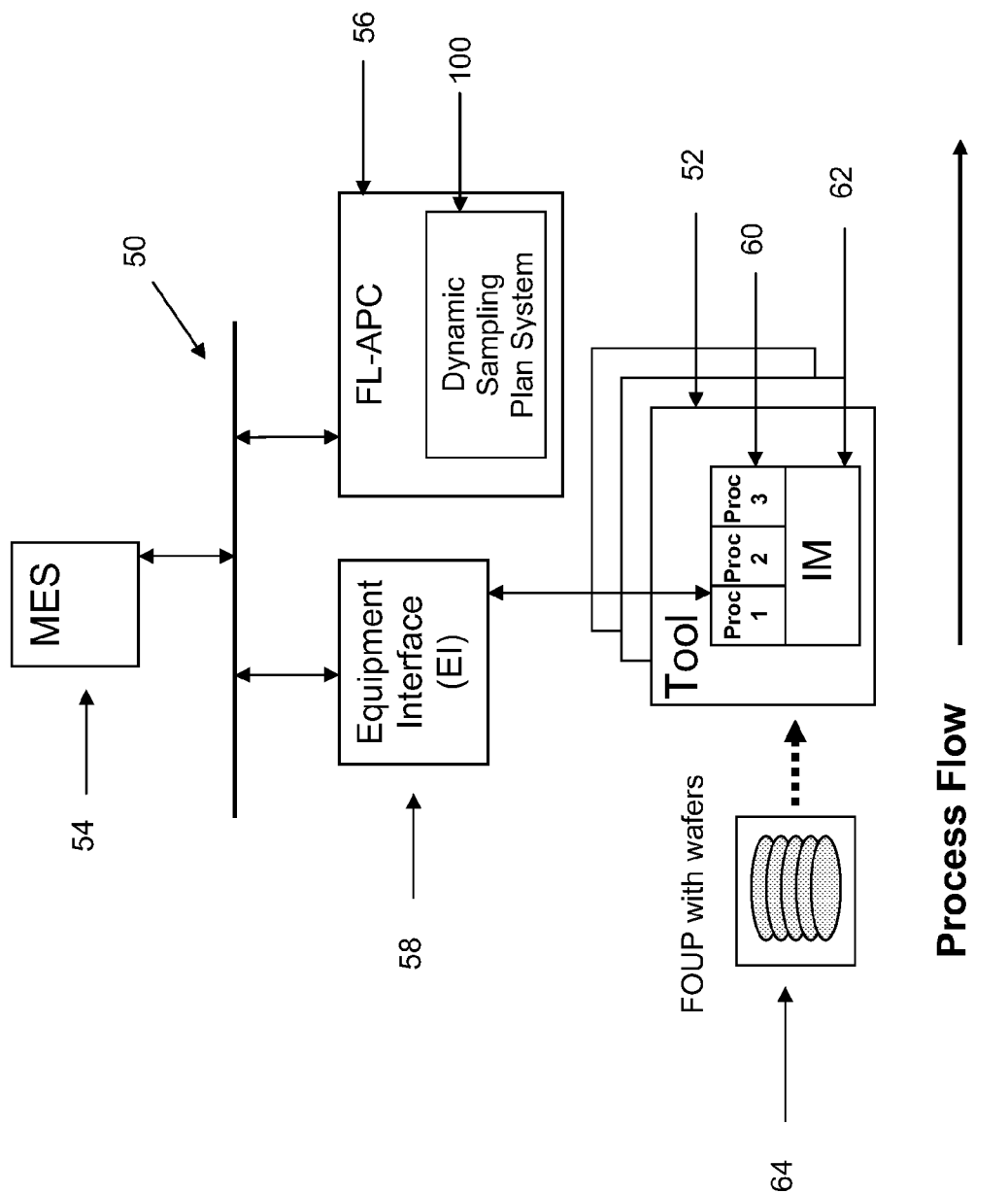
FIG. 2 shows a semiconductor fabrication environment according to an embodiment of the present invention.

With reference to the accompanying drawings, FIG. 2 shows an illustrative semiconductor fabricator environment 50 according to the invention. Environment 50 includes a number of tools 52, a manufacturing execution system (MES) 54 that controls all product movements through the environment 50, e.g., it schedules product movements, a factory level advanced process control (FL-APC) system 56, an equipment interface (EI) 58 that interfaces with MES 54, and different tools 52. Although not shown, middleware may be present for communication between MES 54, FL-APC system 56 and/or EI 58. FL-APC system 56 uses measurements of particular structures before (pre) and/or after (post) a particular processing step, and provides corrections to recipes (e.g., a recipe parameter adjustment (RPA)) for feeding forward and/or feeding back to tools 52 to achieve a better product.

Continuing with FIG. 2, each tool 52 includes process equipment, or process chambers 60 particular to a function, e.g., an etching chamber, gas source, appropriate electronics, etc., in the case of an etching tool 52. Metrology instruments may be provided as an integrated metrology (IM) system 62 and/or external metrology systems (not shown). Each tool 52 also may include a tool level APC (TL-APC) system (not shown), which similar to FL-APC system 56 may use pre-measurements and post-measurements of particular structures and provide corrections to recipes for feeding forward and/or feeding back to process chambers 60 of the tool 52 or to other tools 52 to achieve a better product. A dynamic sampling plan system 100 is provided that is integrated into FL-APC system 56 and passes a sampling plan dynamically to IM system 62 during run time, as part of a recipe parameter update managed by MES 54. One advantage of this configuration is that a significant improvement in the throughput of tool 52 can be realized. For example, in a wafer manufacturing environment it has been discovered that by employing an embodiment of the present invention that a wafer per hour throughput increases from approximately 24 wafers per hour to approximately 32 wafers per hour by tool 52. It should be recognized that the positioning of dynamic sampling plan system 100, as well as MES 54, EI 58, FL-APC system 56, etc., is only illustrative, and that the positioning can be changed as required by a user.

Figure 3:
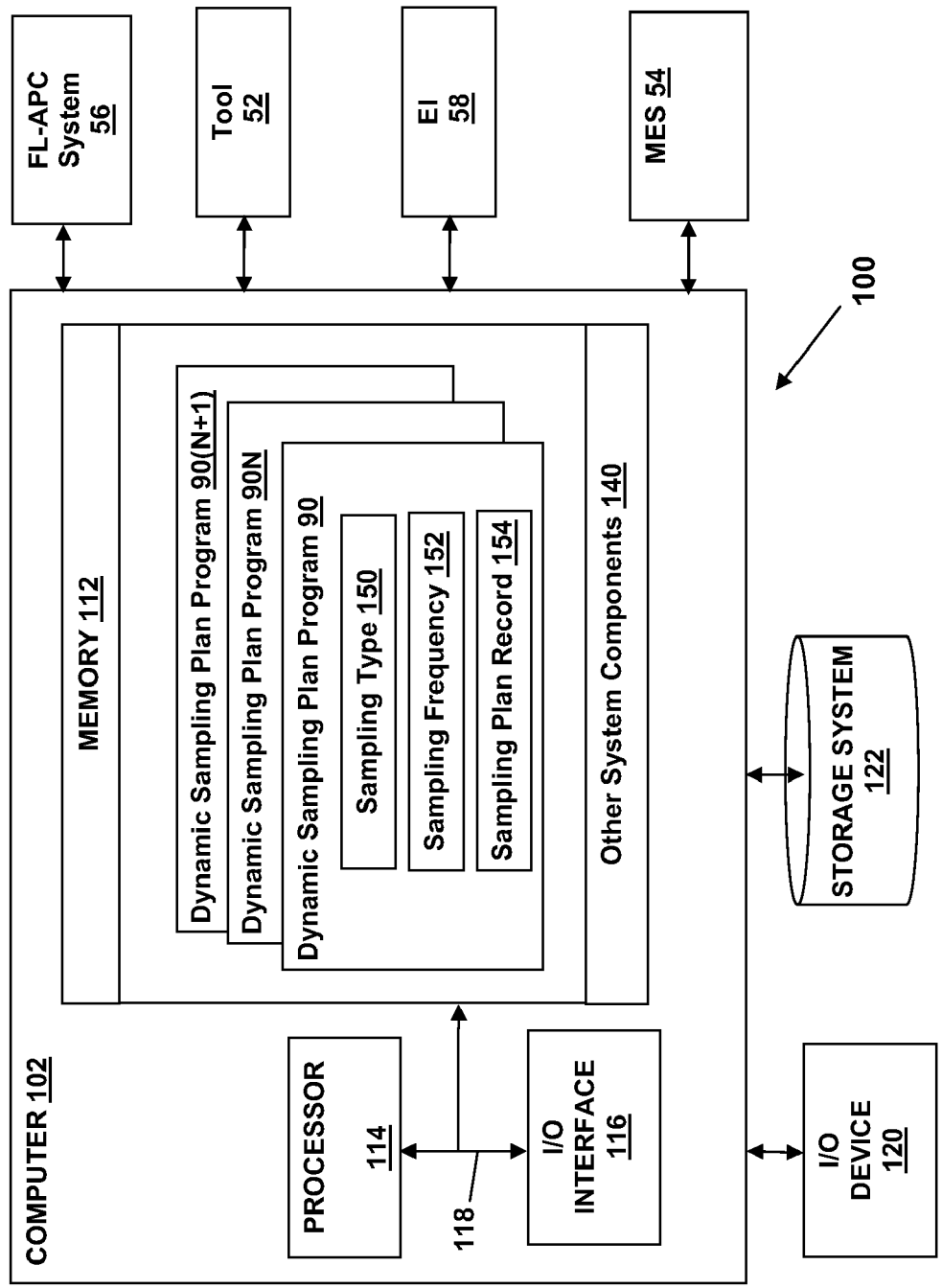
FIG. 3 shows a dynamic sampling plan system according to an embodiment of the present invention.

Referring to FIG. 3, an embodiment of a dynamic sampling plan system 100 in accordance with the invention is shown. In this embodiment, dynamic sampling plan program 90 is shown implemented on computer 102 as computer program code. To this extent, computer 102 is shown including a memory 112, a processor 114, an input/output (I/O) interface 116, and a bus 118. Further, computer 102 is shown in communication with an external I/O device/resource 120, a storage system 122, tool 52, MES 54, EI 58, and FL-APC system 56. In general, processor 114 executes computer program code, such as dynamic sampling plan program 90, which is stored in memory 112 and/or storage system 122. While executing computer program code, processor 114 can read and/or write data, such as a dynamic sampling plan (see e.g., FIG. 4) to/from memory 112, storage system 122, and/or I/O interface 116. Bus 118 provides a communications link between each of the components in computer 102, and I/O device 120 can comprise any device that enables a user and/or another device to interact with computer 102.

In any event, computer 102 can comprise any general purpose computing article of manufacture capable of executing computer program code installed by a user (e.g., a personal computer, server, handheld device, etc.). However, it is understood that computer 102, dynamic sampling plan program 90, and dynamic sampling plan system 100 are only representative of various possible equivalent computing devices that may perform the process of the invention. To this extent, in other embodiments, computer 102 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer 102 is only illustrative of various types of computer infrastructures for implementing the invention. For example, in one embodiment, computer 102 comprises two or more computing devices (e.g., a server cluster) that communicate over any type of wired and/or wireless communications link, such as a network, a shared memory, or the like, to perform the process of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

To this extent, dynamic sampling plan program 90 may further comprise a plurality of dynamic sampling plan programs 90. For example, as shown in FIG. 3, an embodiment may include multiple dynamic sampling plan programs 90, 90N, and 90(N+1). Regardless, it is understood and as discussed further herein, that each dynamic sampling plan program 90 can comprise the same components (e.g., a sampling type 150, a sampling frequency 152, and a sampling plan record 154). Memory 112 may further comprise other systems components 140 known in the art.

Figure 4:
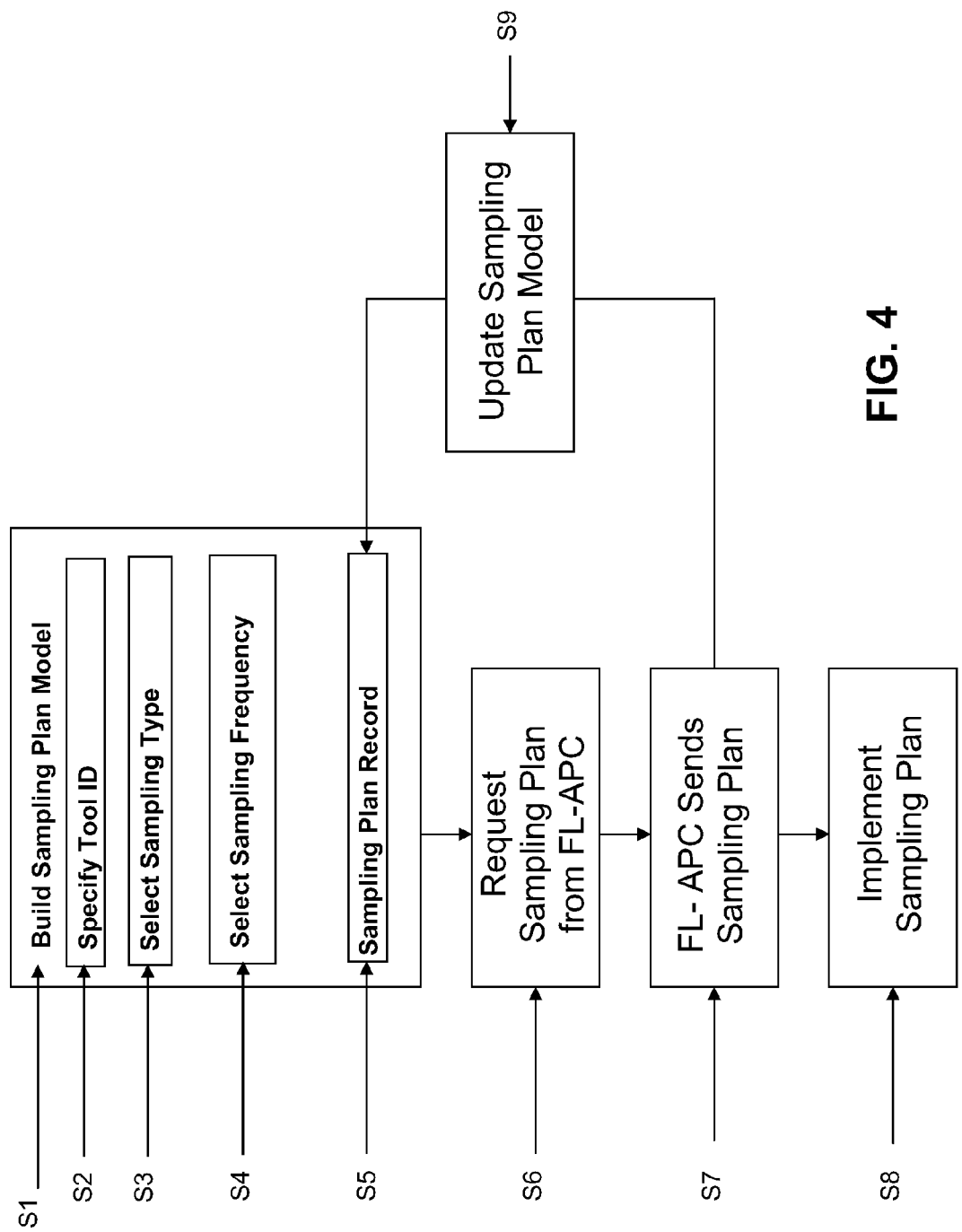
FIG. 4 shows a flow diagram of an embodiment of a method of operation of the present invention.

Turning to FIG. 4, a flow diagram of one embodiment of a method of operation of a dynamic sampling plan system 100 is illustrated. Description of FIG. 4 will be made in conjunction with FIGS. 2 and 3. The method includes providing how a dynamic sampling plan is modeled, requested, implemented, and passed to tool 52 during each manufacturing cycle (or "run").

In a first step S1, a dynamic sampling plan model is built by sampling plan system 100 in FL-APC system 56 during each run. Step S1 may further comprise several sub-steps, such as steps S2 through S5. Step S2 ("Specify Tool ID") may comprise specifying which tool 52 (e.g., "Tool1", "Tool2", etc.) in system 50 requires a dynamic sampling plan. Step S3 ("Select Sampling Type") may comprise selecting a sampling type 150. Available sampling types 150 may comprise, for example, two sampling options wherein a first option includes a fixed sampling frequency, and a second option which includes matching wafers that are pre-measured. Other sampling types may be available for other options. Step S4 ("Select Sampling Frequency") may comprise selecting a sampling frequency 152. Sampling frequency 152 typically may be employed when fixed sampling frequency is selected during step S3. Sampling frequency 152 may comprise, for example, selecting a sampling number such as every wafer, no wafer, or every nth wafer. Alternatively, a sampling number need not be selected in an embodiment, for example, where matching of wafers is selected in step S3. Step S5 ("Sampling Plan Record") follows wherein a sampling plan record 154 is updated and recorded, by the dynamic sampling plan system 100 in the FL-APC 56, every time that a lot (e.g., wafers) is run. The sampling plan record 154 is typically a recordation of the actual sampling plan that was executed by the tool 52 during the lot run and may include, for example, all wafers, no wafers, a fixed frequency "x", and/or wafers that were pre-measured.

In a next step S6, typically conducted during front opening unified pod (FOUP) 64 reservation time, MES 54 sends a request to FL-APC system 56 and queries for a recommendation of a sampling plan for a particular FOUP 64. The reservation time includes the time period before the arrival of FOUP 64 at tool 52 and tool 52 has commenced activity on FOUP 64. During the reservation time, typically after a successful runtime handshaking between MES 54 and FL-APC 56, the FOUP 64 is served by MES 54 with logistical information (e.g., tool ID, recipe, route, operational information, etc.).

In steps S7 and S8, dynamic sampling plan system 100 in FL-APC system 56 determines the sampling plan based on what has been modeled (e.g., step S1 and steps S2-S5) and FL-APC system 56 sends a response back to MES 54. The response may comprise a recommended sampling plan. MES 54 may further send recommended sampling plan to EI 58, where the EI 58 may use the recommended sampling plan in creating a process job. The process job, incorporating the recommended sampling plan, is used by tool 52. In this manner, the tool 52 benefits in the receipt and use of the recommended sampling plan.

A final step S9 of method comprises dynamic sampling plan system 100 in FL-APC system 56 updating the dynamic sampling plan system 100, the sampling plan model that has been used, and a return to step S5 as discussed herein.

It is understood that the order of the above-described steps is only illustrative. To this extent, one or more steps can be performed in parallel, in a different order, at a remote time, etc. Further, one or more of the steps may not be performed in various embodiments of the invention. In addition, use of dynamic sampling plan system 100 in a semiconductor fabrication environment 50 is only illustrative as the invention may find application in a number of different manufacturing settings.

While shown and described herein as a method and system for providing a dynamic sampling plan for integrated metrology (IM) associated with a wafer manufacturing process tool, it is understood that the invention further provides various alternative embodiments. For example, in one embodiment, the invention provides a computer-readable medium that includes computer program code to enable a computer infrastructure to provide a dynamic sampling plan for integrated metrology (IM) associated with a wafer manufacturing process tool. To this extent, the computer-readable medium includes program code, such as dynamic sampling plan system 100 (FIG. 3), that implements the process of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 3) and/or storage system 122 (FIG. 3) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process of the invention on a subscription, advertising, and/or fee basis. That is, a service provider, such as an Application Service Provider, could offer to provide a dynamic sampling plan for integrated metrology (IM) associated with a wafer manufacturing process tool as described above. In this case, the service provider can manage (e.g., create, maintain, support, etc.) a computer infrastructure, such as computer 102 (FIG. 3), that performs the process of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for providing a dynamic sampling plan for integrated metrology (IM) associated with a wafer manufacturing process tool. In this case, a computer infrastructure, such as computer 102 (FIG. 3), can be obtained (e.g., created, maintained, having made available to, etc.) and one or more systems for performing the process of the invention can be obtained (e.g., created, purchased, used, modified, etc.) and deployed to the computer infrastructure. To this extent, the deployment of each system can comprise one or more of (1) installing program code on a computing device, such as computer 102 (FIG. 3), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method comprising:
  modeling a sampling plan for use with a factory level advanced processing control (FL-APC) system;
  receiving a request for a sampling plan; and
  sending a recommended sampling plan, based upon the request and the modeling.

2. The method of claim 1, wherein the sending includes:
  sending the recommended sampling plan for processing by a manufacturing execution system (MES).

3. The method of claim 1, wherein the receiving is during a front opening unified pod (FOUP) reservation time.

4. The method of claim 1, wherein the modeling includes:
  selecting a sampling type; and
  selecting a sampling frequency.

5. The method of claim 1, further comprising:
  updating the modeled sampling plan, based on the recommended sampling plan.

6. The method of claim 1, further comprising:
  implementing the recommended sampling plan at a tool.

7. The method of claim 6, wherein the tool comprises a wafer manufacturing process tool.

8. A method for deploying an application for providing a dynamic sampling plan for integrated metrology, comprising:
  providing a computer infrastructure being operable to:
    model a sampling plan for use with a factory level advanced processing control (FL-APC) system;
    receive a request for a sampling plan; and
    send a recommended sampling plan, based upon the request and the modeling.

* * * * *